US009704603B2

(12) United States Patent
Ventikos et al.

(10) Patent No.: US 9,704,603 B2
(45) Date of Patent: Jul. 11, 2017

(54) HIGH VELOCITY DROPLET IMPACTS (75) Inventors: Yiannis Ventikos, Oxford (GB); Nicholas Hawker, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 579 days.

(21) Appl. No.: 13/511,855

(22) PCT Filed: Nov. 26, 2010

(86) PCT No.: PCT/GB2010/051974
§ 371 (c)(1),
(2), (4) Date: May 24, 2012

(87) PCT Pub. No.: WO2011/064592
PCT Pub. Date: Jun. 3, 2011

(65) Prior Publication Data
US 2012/0281797 A1   Nov. 8, 2012

(30) Foreign Application Priority Data
Nov. 27, 2009  (GB) .................................. 0920814.1

(51) Int. Cl.
*G21B 3/00* (2006.01)
(52) U.S. Cl.
CPC ................ *G21B 3/00* (2013.01); *Y02E 30/18* (2013.01)
(58) Field of Classification Search
None
See application file for complete search history.

(56) References Cited

U.S. PATENT DOCUMENTS

| 3,417,829 A | 12/1968 | Acheson et al. |
| 3,624,239 A | 11/1971 | Fraas |
| 3,953,617 A | 4/1976 | Smith et al. |
| 2003/0215046 A1 | 11/2003 | Hornkohl |
| 2006/0187277 A1 | 8/2006 | Dean et al. |
| 2008/0037694 A1 | 2/2008 | Dean et al. |
| 2010/0124142 A1 | 5/2010 | Laugharn, Jr. et al. |
| 2011/0228890 A1* | 9/2011 | Dean et al. ................... 376/151 |

(Continued)

FOREIGN PATENT DOCUMENTS

| CN | 1603772 A | 4/2005 |
| CN | 102759439 A | 10/2012 |

(Continued)

OTHER PUBLICATIONS

Brenner et al., "Single-bubble sonoluminescence," Rev. Mod. Phys. v. 74, Apr. 2002 p. 425.*

(Continued)

*Primary Examiner* — Sean P Burke
(74) *Attorney, Agent, or Firm* — Cantor Colburn LLP (57) ABSTRACT

A method of impacting liquid droplets onto a surface includes providing a series of liquid droplets, and directing the liquid droplets at a non-planar target surface to cause a shockwave in the droplets upon impact. An apparatus for impacting liquid droplets onto a surface includes a mechanism to produce a series of liquid droplets, and a mechanism to direct the liquid droplets at a non-planar target surface to cause a shockwave in the droplets upon impact. The non-planar target surface is shaped to intensify the shockwave in the droplets.

14 Claims, 4 Drawing Sheets (56) References Cited

U.S. PATENT DOCUMENTS

| | | |
|---|---|---|
| 2012/0288047 A1 | 11/2012 | Ventikos et al. |
| 2013/0114774 A1 | 5/2013 | Ventikos et al. |
| 2015/0139378 A1 | 5/2015 | Hawker et al. |
| 2016/0012921 A1 | 1/2016 | Ventikos et al. |
| 2016/0019984 A1 | 1/2016 | Ventikos et al. |

FOREIGN PATENT DOCUMENTS

| | | |
|---|---|---|
| JP | H04158200 | 6/1992 |
| JP | H06198496 | 7/1994 |
| JP | 2001193381 | 7/2001 |
| WO | 02097823 A1 | 12/2002 |
| WO | 03034441 A1 | 4/2003 |
| WO | 2011064594 A2 | 6/2011 |
| WO | 2011138622 A1 | 11/2011 |

OTHER PUBLICATIONS

Taleyarkhan et al., "Evidence for Nuclear Emissions During Acoustic Cavitation," Science Mar. 8, 2002, v. 295 p. 1868.*
Seife, "'Bubble Fusion' Paper Generates a Tempest in a Beaker," Science Mar. 8, 2002, v. 295 p. 1808.*
Shapira et al., "Nuclear Fusion in Collapsing Bubbles—Is It There? An Attempt to Repeat the Observation of Nuclear Emissions from Sonoluminescence," Phys. Rev. Lett. v. 89, n. 10, Sep. 2, 2002, 104302.*
Galonsky, "Tabletop Fusion Revisited," Science, v. 297, Sep. 6, 2002, p. 1645.*
Taleyarkhan et al., "Additional evidence of nuclear emissions during acoustic cavitation," Phys. Rev. E v. 69 Mar. 22, 2004, 036109.*
Xu et al., "Confirmatory experiments for nuclear emissions during acoustic cavitation," Nuc. Engr. Des. v. 235, Feb. 21, 2005, p. 1317.*
Taleyarkhan et al., "Nuclear Emissions During Self-Nucleated Acoustic Cavitation," Phys. Rev. Lett. 96, 034301 Jan. 10, 2006.*
Peplow, "Desktop Fusion is Back on the Table," Jan. 10, 2006, doi:10.1038/news060109-5 last accessed Sep. 27, 2012.*
Ed. "Bubble fusion: silencing the hype," Mar. 8, 2006 doi:10.1038/news060306-1 last accessed Sep. 27, 2012.*
Naranjo, "Comment on 'Nuclear Emissions During Self-Nucleated Acoustic Cavitation'", Sep. 12, 2006, arXiv:physics/0603060v2 last accessed Sep. 27, 2012.*
Taleyarkhan et al., "Reply," Phys. Rev. Lett. 97 Oct. 6, 2006, 149404.*
"Report of the Investigation Committee in the Matter of Dr. Rusi P. Taleyarkhan." http://news.uns.purdue.edu/x/2008b/080718PurdueReport.pdf last accessed Sep. 27, 2012.*
Reich, "Bubble-fusion scientist debarred from federal funding," Nature, Nov. 23, 2009, doi:10.1038/news.2009.1103 last accessed Sep. 27, 2012.*
Bourne et al. "The temperature of a shock-collapsed cavity", Proceedings of the Royal Society London, Series A., 2003, pp. 1851-1861, vol. A, No. 459, XP000002654461, London.
Bourne, et al. Shock-induced collapse and luminescence by cavities, Philosophical Transactions of the Royal Society London, Series A., Feb. 1999, pp. 295-311, vol. 357, No. 1751, XP000002654463.
J. H. Brunton, "High speed liquid impact", Royal Society of London Philosophical Transactions Mathematical, Physical and Engineering Sciences, The Royal Society, Jul. 28, 1966, pp. 79-85, vol. 260, London GB, XP008135518.
J. P. Dear et al. "High-speed photography of surface geometry effects in liquid/solid impact", Journal of Applied Physics, Feb. 15, 1988, pp. 1015-1021, vol. 63, No. 4, XP002633349.
D. Felipe Gaitan et al. "Sonoluminescence and bubble dynamics for a single, stable, cavitation bubble", Journal Acoustical Society of America, Jun. 1992, pp. 3166-3183, vol. 91, No. 6.
K. K. Haller et al. "Wave structure in the contact line region during high speed droplet impact on a surface: Solution of the Riemann problem for the stiffened gas equation of state", Journal of Applied Physics, American Institute of Physics, Mar. 1, 2003, pp. 3090-3097, vol. 93, No. 5, XP012059198.
K. K. Haller et al. "Computational study of high-speed liquid droplet impact", Journal of Applied Physics, American Institute of Physics, Sep. 1, 2002, pp. 2821-2828, vol. 92, No. 5, XP012057199.
Nicholas A. Hawker et al. "Shock/Gas Bubble Interactions in Infinite and Finite Volumes of Liquid", 2nd Micro and Nano Flows Conference, Department of Engineering Science, University of Oxford, Sep. 1-2, 2009, pp. 1-5, West London UK.
International Search Report and Written Opinion issued Sep. 16, 2011 by European Patent Office re: PCT/GB2011/050889; pp. 12; citing: Tullis et al. "Cavitation Guide . . . ", Sushchikh et al. "Shock waves . . . ", Bourne et al., "The temperature . . . ", Bourne et al., "Shock-induced . . . " and WO 03/034441 A1.
International Search Report and Written Opinion issued Apr. 28, 2011 re: PCT/GB2010/051974, pp. 11; citing US 2008/037694 A1, Rein et al. "Phenomena of liquid . . . ", Haller et al. "Computational study . . . ", Haller et al. "Wave structure . . . ", Range et al. "Influence of surface . . . ", and US 2006/187277.
International Search Report issued Jun. 9, 2011 re: PCT/GB2010/051976, pp. 11; citing: Brunton "High speed liquid . . . ", Rein et al. "Phenomena of liquid . . . ", Sivakumar et al. "Spreading behavior . . . ", US 2008/037694 A1, and Dear et al. "High-speed photography . . . ".
J. Paul Tullis, "Cavitation Guide for Control Valves", Tullis Engineering Consultants NUREG/CR-6031, Apr. 1993, pp. 1-106, XP000002654460, http://www.iaea.org/inis/collectin/NCLCollectionStore/_Public/24/072/24072618.pdf.
Kai Range et al. "Influence of surface roughness on liquid drop impact", Journal of Colloid and Interface Science, Jul. 1, 1998, pp. 16-30, vol. 203, CS985518, XP002632536.
Martin Rein et al. "Phenomena of liquid drop impact on solid and liquid surfaces", Fluid Dynamics Research, North-Holland, Aug. 1, 1993, pp. 61-93, vol. 12, No. 2, XP024733663.
D. Shapira et al. "Nuclear Fusion in Collapsing Bubbles—Is It There? An Attempt to Repeat the Observation of Nuclear Emisions from Sonoluminescence", The American Physical Society, Physical Review Letters, Sep. 2, 2002, pp. 104302-1-104302-4, vol. 89, No. 10.
D. Sivakumar et al. "Spreading behavior of an impacting drop on a structured rough surface", Physics of Fluids, Oct. 2005, pp. 1-10, vol. 17, No. 10, XP002633348.
Sushchikh et al. "Shock waves and flow patterns in a shock-induced bubble collapse", American Institute of Aeronautics and Astronautics, 2005, pp. 01-12, vol. AIAAA 2005-1291, XP000002654462.
R. P. Taleyarkhan et al. "Evidence for Nuclear Emissions During Acoustic Cavitation", Science, Research Articles, Mar. 2, 2002, pp. 1868-1873, vol. 295, downloaded from www.sciencemag.org on Nov. 24, 2009.
A. Philipp et al. "Cavitation erosion by single laser-produced bubbles", J. Fluid Mech., 1998, vol. 361, pp. 75-116.
B. Wolfrum et al. "Luminescence of transient bubbles at elevated ambient pressures", The American Physical Society, Sep. 25, 2001, vol. 64, pp. 046306-1-046306-5.
D. Felipe Gaitan et al. "Transient cavitation in high-quality-factor resonators at high static pressures", Journal of the Acoustical Society of America, Jun. 2010, vol. 127, No. 6, pp. 3456-3465; XP002715356.
Dennis Kroninger et al. "Particle tracking velocimetry of the flow field around a collapsing cavitation bubble", Exp Fluids, 2010, vol. 48, pp. 395-408.
Emil A. Brujan et al. "Properties of luminescence from laser-created bubbles in pressurized water", The American Physical Society, Dec. 21, 2005, vol. 72, No. 6, pp. 066310-1-066310-6, USA.
Eric Johnsen et al. "Numerical simulations of non-spherical bubble collapse", Journal of Fluid Mechanics, Jun. 25, 2009, vol. 629, pp. 231-262; XP002715357.
GB Office Action issued Sep. 24, 2012 re: Application No. GB1208939.7; citing: WO 2011/138622 A1 and WO 2011/064592 A1.

(56) References Cited

OTHER PUBLICATIONS

International Search Report and Written Opinion issued Nov. 20, 2013 re: Application No. PCT/GB2013/051297; pp. 1-11; citing: WO 2011/138622, Gaitan et al. "Transient", Johnsen et al. "Numerical" and Tullis Cavitation.

M. Barbaglia et al. "Search of Fusion Reactions During the Cavitation of a Single Bubble in Deuterated Liquids", Physica Scripta, 2005, vol. 72, pp. 75-78, Argentina.

Milton S. Plesset et al. "Bubble Dynamics and Cavitation", Annual Review Fluid Mech., 1977, vol. 9, pp. 145-185; www.annualreviews.org/aroline.

Werner Lauterborn et al. "News from bubble dynamics: high static pressures, shock waves and interior dynamics", The 19th International Symposium on Nonlinear Acoustics, 1 page.

Japan Office Action for Japanese Patent Application No. 2013-508557, OA Transmission Date Mar. 10, 2015, 5 pages, non-English Translation.

Japan Office Action for Japanese Patent Application No. 2013-508557, OA Transmission Date Mar. 10, 2015, 9 pages, English Translation.

Decorso et al.; "Erosion by Liquid Impact"; ASTM International; 1962; p. 41.

Hawker et al.; "Interaction of a Strong Shockwave with a Gas Bubble in a Liquid Medium: A Numerical Study"; J. Fluid Mech., vol. 701; 2012; pp. 59-97.

International Search Report for International Application No. PCT/GB2014/050661, International Filing Date Mar. 6, 2014, Date of Mailing Jul. 4, 2014, 5 pages.

International Search Report for International Application No. PCT/GB2014/050663, International Filing Date Mar. 6, 2014, Date of Mailing Jul. 4, 2014, 5 pages.

Johnsen et al.; "Shock-Induced Collapse of a Gas Bubble in Shockwave Lithotripsy"; J. Acoustical Society of America, vol. 124, No. 4; Oct. 2008; pp. 2011-2020.

Lauer et al.; "Numerical Investigation of Collapsing Cavity Arrays"; Physics of Fluids, vol. 24; 2012; pp. 1-24.

Matthujak et al.; "High Speed Jet Formation by Impact Acceleration Method"; Shock Waves, vol. 16; 2007; pp. 405-419.

Shi et al.; "Generation of High-Speed Liquid Jets by High-Speed Impact of a Projectile"; JSME Internation Journal, Series B, vol. 38, No. 2; 1995; pp. 181-190.

Shi et al.; "The Measurement of Impact Pressure and Solid Surface Response in Liquid-Solid Impact up to Hypersonic Range"; Wear, vol. 186-187; 1995; pp. 352-359.

Surov; "Interaction of a Shock Wave with a Bubble Screen"; Technical Physics, vol. 44, No. 1; Jan. 1999; pp. 37-43.

Swantek et al.; "Collapse of Void Arrays Under Stress Wave Loading"; Journal of Fluid Mechanics, vol. 649; Apr. 2010; pp. 399-427.

Written Opinion for International Application No. PCT/GB2014/050661, International Filing Date Mar. 6, 2014, Date of Mailing Jul. 4, 2014, 7 pages.

Written Opinion for International Application No. PCT/GB2014/050663, International Filing Date Mar. 6, 2014, Date of Mailing Jul. 4, 2014, 7 pages.

Japan Office Action for Japanese Patent Application No. 2012-540500, OA transmission date Apr. 28, 2015, 2 pages, non-English Translation.

Japan Office Action for Japanese Patent Application No. 2012-540500, OA transmission date Apr. 28, 2015, 3 pages, English Translation.

\* cited by examiner

HIGH VELOCITY DROPLET IMPACTS

TECHNICAL FIELD

This invention relates to methods and apparatus for generating impacts between high velocity liquid droplets and a target in order to produce very high localised energies.

BACKGROUND

The development of fusion power has been an area of massive investment of time and money for many years. This investment has been largely centred on developing a large scale fusion reactor, at great cost. However, there are other theories that predict much simpler and cheaper mechanisms for creating fusion. Of interest here is the umbrella concept "inertial confinement fusion", which uses mechanical forces (such as shock waves) to concentrate and focus energy into very small areas.

Much of the belief in inertial confinement fusion comes from observations of a phenomenon called sonoluminescence. This occurs when a liquid containing appropriately sized bubbles is driven with a particular frequency of ultrasound. The pressure wave causes the bubble to expand and then collapse very violently; a process usually referred to as inertial cavitation. The rapid collapse of the bubble leads to non-equilibrium compression that causes the contents to heat up to an extent that they emit light [Gaitan, D. F., Crum, L. A., Church, C. C., and Roy, R. A. Journal of the Acoustical Society of America 91(6), 3166-3183 June (1992]. There have been various efforts to intensify this process and one group has claimed to observe fusion [Taleyarkhan, R. P., West, C. D., Cho, J. S., Lahey, R. T., Nigmatulin, R. I., and Block, R. C. *Science* 295(5561), 1868-1873 March (2002)]. However, the observed results have not yet been validated or replicated, in spite substantial effort [Shapira, D. and Saltmarsh, M. *Physical Review Letters* 89(10), 104302 September (2002)]. This is not the only proposed mechanism that has led to luminescence from a collapsing bubble; however it is the most documented. Luminescence has also been observed from a bubble collapsed by a strong shock wave [Bourne, N. K. and Field, J. E. *Philosophical Transactions of the Royal Society of London Series A-Mathematical Physical and Engineering Sciences* 357(1751), 295-311 February (1999)]. It is this second method that this invention relates to.

It has been proposed in U.S. Pat. No. 7,445,319 to fire spherical drops of water moving at very high speed (~1 km/s) into a rigid target to generate an intense shock wave. This shock wave can be used to collapse bubbles that have been nucleated and subsequently have expanded inside the droplet. It is inside the collapsed bubble that the above-mentioned patent expects fusion to take place. The mechanism of shockwave generation by high-speed droplet impact on a surface has been studied experimentally and numerically before and is well-documented (including work by one of the present patent inventors, [Haller, K. K., Ventikos, Y., Poulikakos, D., and Monkewitz, P. *Journal of Applied Physics* 92(5), 2821-2828 September (2002)].)

BRIEF SUMMARY

The present invention aims to provide an improvement on the aforementioned techniques and may also have other applications. When viewed from a first aspect the invention provides a method of impacting liquid droplets onto a surface comprising providing a series of liquid droplets, directing said liquid droplets at a non-planar target surface to cause a shockwave in the droplets upon impact, the non-planar target surface being shaped to intensify the shockwave in the droplet.

The invention also extends to apparatus for impacting liquid droplets onto a surface comprising means for producing a series of liquid droplets, means for directing said liquid droplets at a non-planar target surface to cause a shockwave in the droplets upon impact, wherein said non-planar target surface is shaped to intensify the shockwave in the droplet.

The Applicant notes that the scope of the present invention does not extend to the shockwave comprising an ultrasound shockwave. Thus, the scope of the present invention does not include the pocket of gas being collapsed through the process of sonoluminescence.

Thus it will be seen by those skilled in the art that in accordance with the invention, rather than a simple planar target being employed, the target is shaped in order to intensify the shockwave generated by the droplet impact. This can give much higher peak energy densities in the droplet than in the known techniques: for example modelling of a particular embodiment of the shaped target of the present invention can give a peak pressure inside the droplet approximately double that obtained with an otherwise identical droplet impacting a planar target.

The invention has many potential applications as will be mentioned again hereinbelow. However it is considered to be particularly applicable to droplets having cavities therein whereby impact of the droplet onto the target causes implosion of the cavities in the manner specifically described in U.S. Pat. No. 7,445,319. Accordingly, a set of embodiments comprises the steps of producing a pressurised liquid jet stream comprising a liquid and a nano-particle material, causing the break-up of said jet stream producing a plurality of droplets containing liquid and nano-particle material and irradiating the droplets with energy to produce and expand cavities within the droplets. Another set of embodiments comprises the steps of producing a pressurised liquid jet stream comprising a liquid and a volatile emulsion and causing the break-up of said jet stream, producing a plurality of droplets containing both said liquid and said volatile emulsion. The emulsion then causes bubbles to form in the droplets.

There are a wide variety of target surface shapes which can give rise to intensification of the shockwave in the droplets. The inventors have realised that an important criterion is that the surface is shaped such that the boundary of the contact patch between the droplet and the surface travels at a supersonic speed significantly beyond the initial moment of collision, e.g. for a 100 micron droplet moving at 1000 meters per second, the contact line remains supersonic for at least 20 nanoseconds after impact. The inventors have observed that in the case of a planar target surface, when the droplet initially impacts the target, the edge of the contact patch has a high instantaneous speed. It has also been observed that there is a very strong shock wave formed and that whilst the motion of the contact line between the surface of the droplet and the target remains supersonic in relation to the liquid's speed of sound, the shock remains pinned to the wall. During this time where the shock is pinned to the wall, it is being intensified. When the contact line speed falls below the speed of sound in the liquid, the shock begins to move outwards into the droplet to eventually strike the bubble nucleated within the droplet's interior.

By making the shape of the target surface conform to the shape of the droplet in accordance with the invention, the speed of propagation of the edge of the contact patch is maintained at a supersonic level for a longer time, leading to a stronger shockwave.

In a preferred set of embodiments, the target surface is concave which has the effect of focussing the energy and intensifying the initial formation of the shockwave. In some non-limiting examples, the surface could have an ellipsoid or paraboloid shape. The surface need not be continuously curved. For example, in one set of embodiments the target surface comprises a plurality of discrete portions, e.g. with a gradient discontinuity between them. The portions could themselves be partial ellipses, parabolas, and so on, but equally could be straight. A particular set of embodiments of surfaces made from discrete portions could be described as piecewise polynomial.

The target surface in accordance with the invention could be shaped such that there is a single contact patch generating a single shockwave (e.g. as would be the case with a shallow elliptic or parabolic shape). However, in a set of potentially advantageous embodiments, the surface is shaped such that there are a plurality of discrete initial contact points between the droplet and surface and therefore a plurality of discrete contact patches and shockwaves propagating into the droplet due to the interactions of the shock waves advancing into the droplet at a later time than the supersonic contact line regime. This can give rise to an even more intense concentration of energy inside the droplet. In a preferred set of embodiments in which the energy focussed into the droplet causes implosion of a cavity, this can increase the success of generating inertial confinement fusion.

The above-mentioned multiple contact points could arise from the discrete surface portions referred to above, with some or all of the portions corresponding to respective contact points. Additionally or alternatively the surface could comprise a plurality of protrusions to act as the multiple contact points.

The target may comprise a solid e.g. a metal, e.g. steel. Indeed any of the target materials disclosed in U.S. Pat. No. 7,445,319 would be suitable. However, it is not essential to use a solid target and it is envisaged that a liquid target could be employed. The required target surface shape could be achieved in a number of ways. For example, the surface of a volume of liquid could be excited with a suitable vibration (e.g. using ultrasound or another method) to generate a wave having the desired shape. Alternatively the desired shape could be achieved through the contact angle between a liquid and a solid surface with appropriately matched wetting properties. Of course, this latter example shows that the surface could comprise a combination of solid and liquid.

In a preferred set of embodiments, the methods described herein are employed to generate nuclear fusion reactions. The fuel for the reaction could be provided by the droplet, the vapour or gas inside the cavity within the droplet, the nano-particle, or the fuel could be provided by the target itself. Any of the fuels mentioned in U.S. Pat. No. 7,445,319 is suitable for use in the present invention.

The fusion reactions which can be obtained in accordance with certain embodiments of the invention could be used for net energy production (the long term research aim in this field), but the inventors have appreciated that even if the efficiency of the fusion is below that required for net energy production, the reliable fusion which is obtainable in accordance with embodiments of the invention is advantageous for example in the production of tritium which can be used as fuel in other fusion projects and is very expensive to produce with currently available technologies. The fusion can also be beneficial in giving a fast and safe neutron source which has many possible applications that will be apparent to those skilled in the art.

Moreover, it is not essential in accordance with the invention to produce fusion at all.

Certain embodiments of the invention will now be described, by way of example only, with reference to the accompanying drawings in which:

BRIEF DESCRIPTION OF THE DRAWINGS

FIGS. 6a to 6e are various possible alternative shapes of the target surface in accordance with the invention;

DETAILED DESCRIPTION

Figure 1:
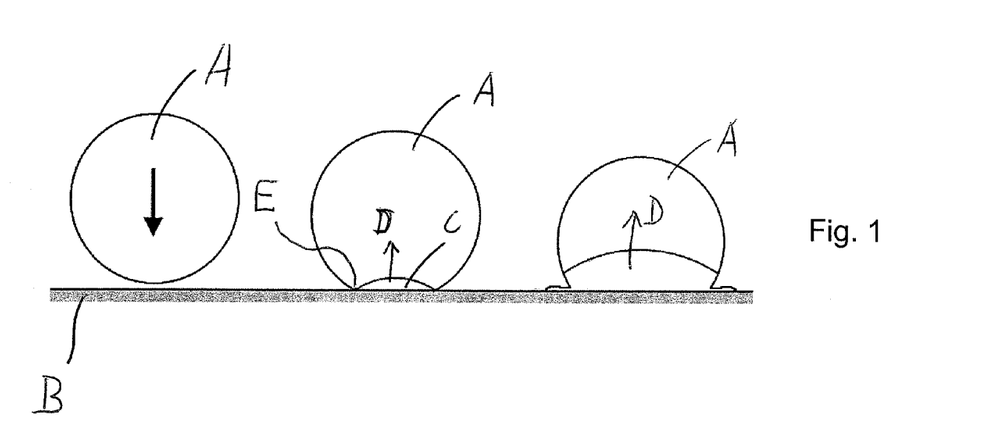
FIG. 1 is a schematic diagram illustrating the impact of a droplet onto a planar target, shown for reference purposes only.

FIG. 1 shows the basic mechanism behind the generation of focussed energy by impact of a droplet A onto a planar target B. This is described in greater detail in U.S. Pat. No. 7,445,319 and [Haller, K. K., Ventikos, Y., Poulikakos, D., and Monkewitz, P. *Journal of Applied Physics* 92(5), 2821-2828 September (2002)]. In the left-hand part of FIG. 1, the droplet A is shown immediately prior to impact. In the central part of the diagram, it is shown that as the droplet A strikes the target B, a strong shockwave C is formed which begins to propagate back inside the droplet as indicated by the arrow D. During the initial moments after impact, the edge E of the contact patch between the droplet A and the target B moves outwardly faster than the route of propagation of the shockwave D, in other words the contact line moves at supersonic speed. At this point, the ends of the shockwave C remain in contact with the target B. However, the speed of the contact line soon falls and the shockwave C begins to propagate into the droplet as shown by the arrow D. For the case of a 100 micrometer droplet travelling at 500 meters per second and striking a flat target surface, this phase is completed after approximately 6 nanoseconds. As the shockwave propagates into the droplet, it causes a rapid implosion and therefore rapid heating of the cavity in the bubble (omitted from FIG. 1 for clarity). This causes intense local heating which can be sufficient to generate a nuclear fusion reaction inside the droplet.

Figure 2:
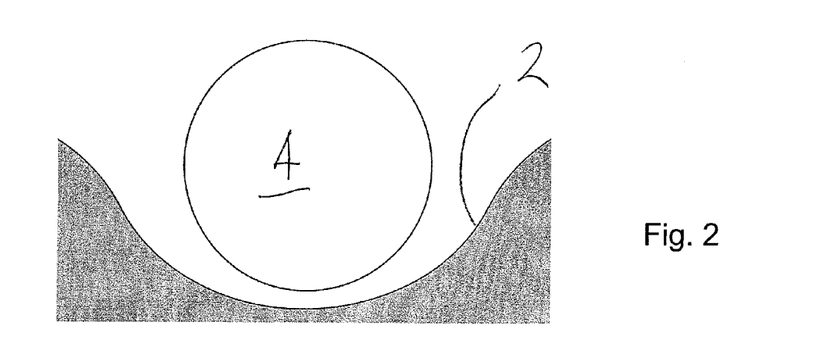
FIG. 2 is a close-up schematic diagram of an enhanced target in accordance with the invention.

FIG. 2 shows, in close-up view, a target surface in accordance with a first embodiment of the present invention. In this embodiment, the target 2 has a curved, concave shape which forms part of an ellipse. As may be appreciated from FIG. 2 and seen more clearly in FIG. 3, the elliptical shape of the target surface 2 conforms more closely to the shape of the droplet 4 which strikes it than a planar target does. It may be seen from this schematic diagram that the major axis of the ellipse is approximately twice the diameter of the droplet 4.

Figure 3:
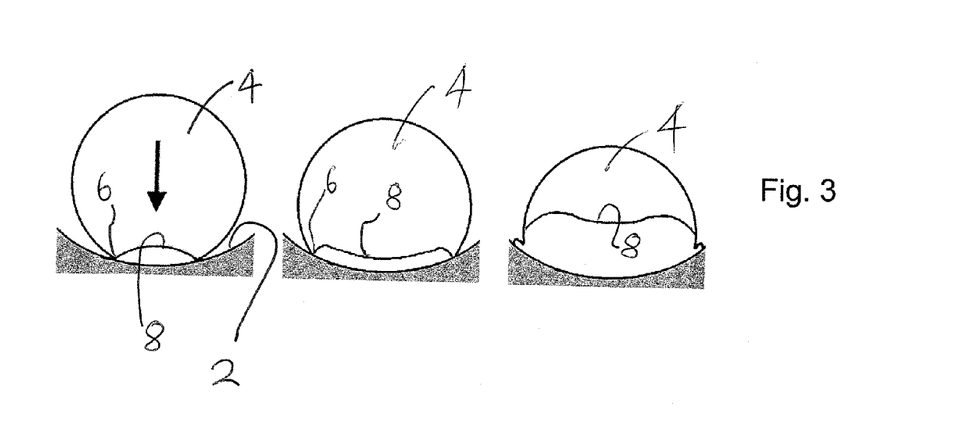
FIG. 3 is a diagram similar to FIG. 1 showing the progress of the shock when a curved target is employed.

FIG. 3 shows the stages of droplet impact and generation of the shockwave as for FIG. 1 in the case of this curved target. As will be seen in this case, the surface 2 conforms better to the shape of the impacted droplet 4 which causes the edge of the contact patch 6 to travel faster than the front of the shockwave 8 for a longer period of time. For the case of a 100 micrometer droplet travelling at 500 meters per second and striking a surface shaped, in accordance with some embodiments of this invention, to resemble a sine wave with a period of 300 micrometers, the supersonic contact line regime is completed after approximately 12 nanoseconds When the shockwave 8 propagates into the droplet as shown by the arrow 10, the resulting pressure behind it is increased due to the intensification of the initial formation of the shockwave 8 by focusing the energy using the shaped surface. The resulting shape of the shockwave 8 as it propagates into the droplet is concave rather than convex (as in the flat target surface case) and this acts to further enhance the pressure behind the shockwave 8 as it strikes the cavity when compared to the flat target surface case. The increased pressure arriving at the cavity (again omitted for clarity) increases the temperature achieved during implosion and the energy available to induce fusion. The fact that the shockwave conforms better to the target bubble's surface is also beneficial.

Figure 4:
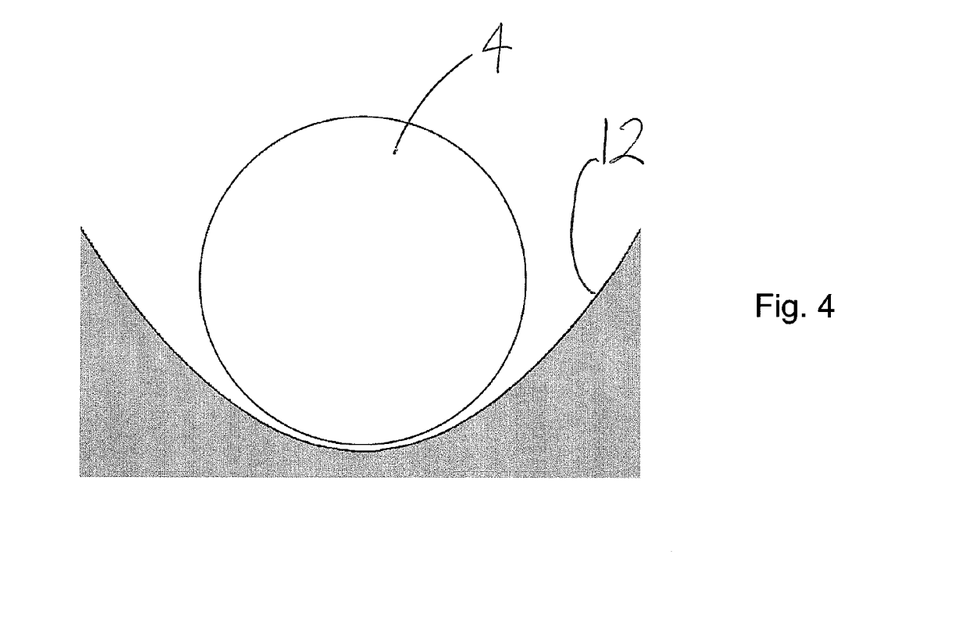
FIG. 4 is a close-up schematic diagram of an alternative target shape in accordance with the invention.

A further embodiment of the invention is shown in FIG. 4. This is similar to the embodiment shown in FIG. 2 except that the target surface 12 in this example is parabolic rather than elliptical. This embodiment gives a slightly greater degree of conformity than the elliptical shape shown in FIG. 2.

Figure 5:
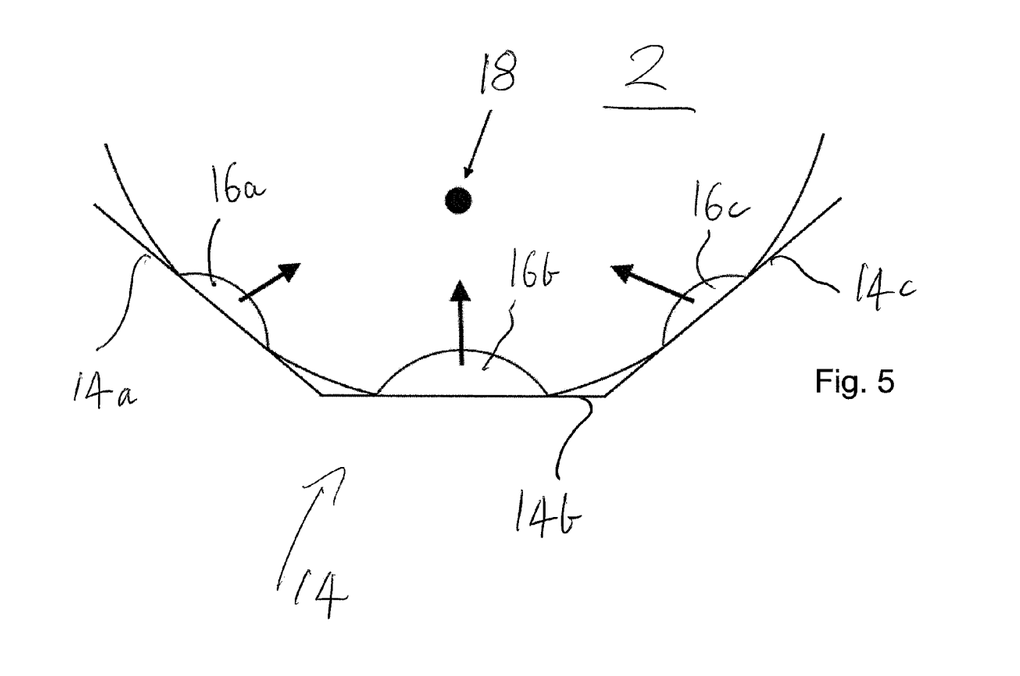
FIG. 5 is a schematic diagram of another embodiment of the invention illustrating multiple shockwaves.
Figure 6A:
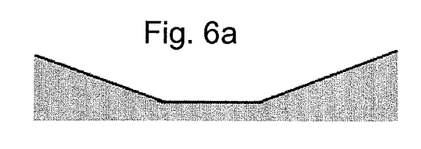
Figure 6B:
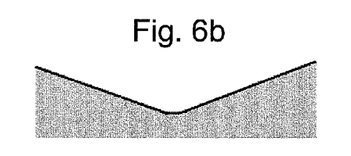
Figure 6C:
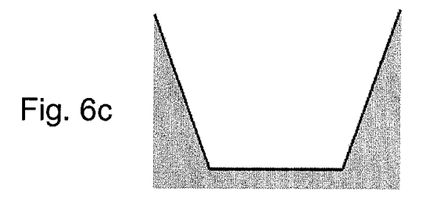
Figure 6D:
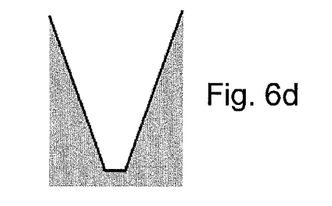
Figure 6E:
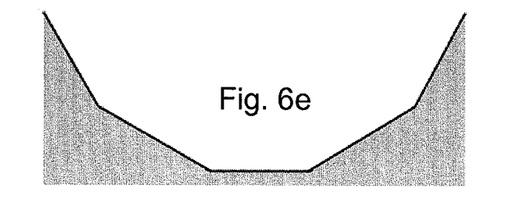

FIG. 5 shows an example of an embodiment in which the target surface is made up of three discrete surface portions 14a to 14c. The individual surface portions 14a to 14c are flat rather than curved in this particular embodiment, although clearly the target surface as a whole is concave. As the diagram illustrates, when the droplet 2 impacts against the target surface 14, there are three separate contact points which give rise to three corresponding shockwaves 16a to 16c. The three shockwaves converge and overlap at a point 18 inside the droplet, reinforcing one another to give an even higher localised pressure and energy density. By optimisation of the surface design, the overlap point can be made to coincide with the cavity, thereby giving more violent implosion and higher peak temperatures inside the bubble.

FIGS. 6a to 6e show various possible alternative surface shapes which give rise to multiple contact points and thereby give the advantages described above.

Figure 7:
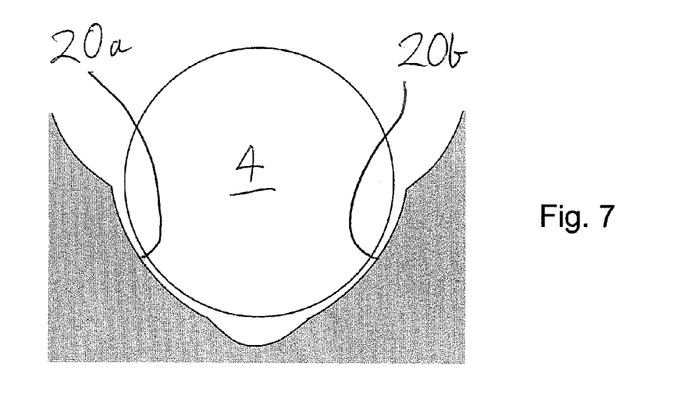
FIG. 7 shows another possible embodiment of the target surface.

FIG. 7 shows a yet further possible embodiment in which the target surface 20 comprises two disjointed surface portions 20a, 20b each of which is curved e.g. as an ellipse or parabola. This can be seen to combine the advantages of a curved surface, described with reference to FIGS. 2 to 4, with the advantages of multiple contact point, described with reference to FIG. 5.

Figure 8A:
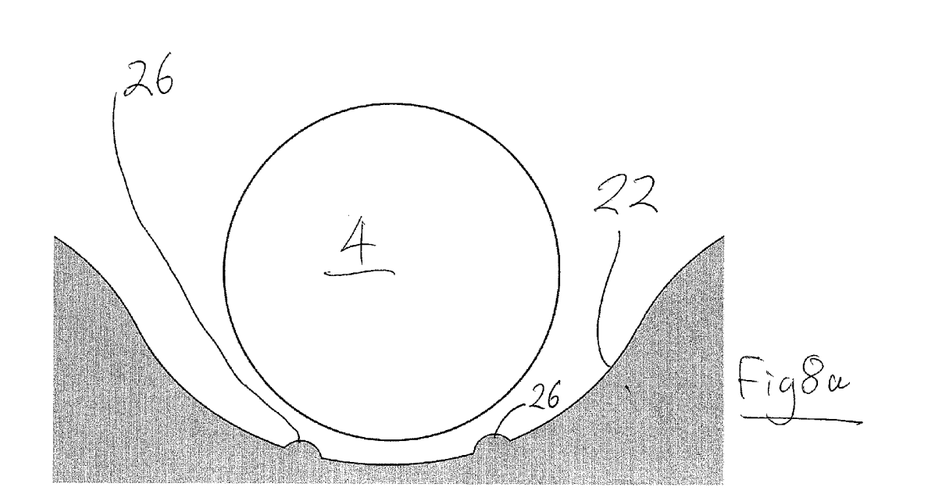
FIGS. 8a and 8b show yet further alternative embodiments of the surface of the target which have protrusions.
Figure 8B:
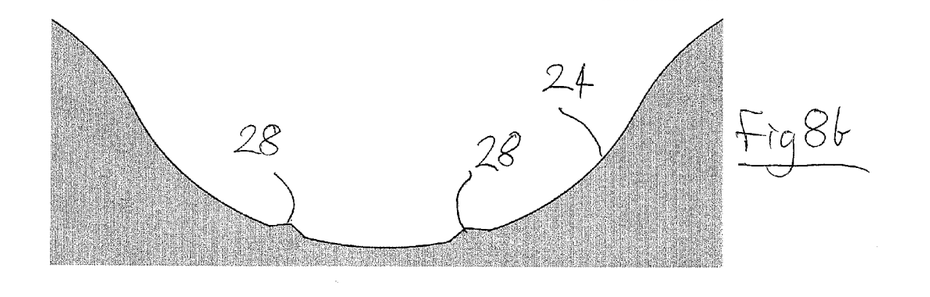

FIGS. 8a and 8b show respectively two possible embodiments which illustrate another principle for combining the advantages of a curved target surface with multiple contact points and thus multiple shockwaves. In these embodiments, the target surface 22, 24 comprises a plurality of discrete protrusions 26, 28 from which shockwaves are generated. In these embodiments, the shockwaves produced by the discrete protrusions 26, 28 will combine with and reinforce those produced by impact with the rest of the surface 22. In this manner the shape of the shockwave that advances into the bubble can be explicitly controlled by shaping the target accordingly.

In each of the embodiments described above, the diagrams shown are a vertical cross-section through a three-dimensional droplet and target surface and hence they depict embodiments that are rotationally symmetric. However, this is not essential to the invention. In particular the surface could comprise discrete surface portions in the rotational direction either instead of, or as well as in the vertical cross-section shown. In the latter case the target surface would be multi-facetted. Each facet could give rise to separate but converging shockwaves. By way of example, a non-rotationally symmetric embodiment of the ideas shown in FIG. 8 could comprise an elliptical dish in the target surface with any arbitrary distribution of protrusions within it.

In all of the embodiments described, the apparatus can be used by firing a stream of very high velocity droplets e.g. of deuterated water containing nano-particles—such as gold—by producing a stream of liquid which is then broken up and irradiated by laser to create vapour cavities within the droplets. This procedure is as described in U.S. Pat. No. 7,445,319 and can be achieved using the apparatus described therein and in U.S. Pat. No. 7,380,918. In an exemplary implementation the droplets have a diameter of approximately 100 microns, travel at a speed of approximately 1 kilometer a second and are produced at a frequency of approximately 1 Megahertz. In numerical modelling of the experiment, this gives rise to a peak pressure of $7.5 \times 10^8$ Pascals which is sufficient to cause temperatures inside the collapsed bubble in excess of 150,000 Kelvin which can be sufficient for a nuclear fusion reaction of the deuterium atoms. In some non-limiting examples the resulting neutrons could be used in other processes, or could be absorbed by a neutron absorber for conversion of the kinetic energy of the neutrons to thermal energy and thus conventional thermodynamic energy generation.

However, there are many other ways of producing power. For example Boron-Hydrogen fusion could also be used. Boron-Hydrogen fusion results in Helium nuclei and the methods used to harness the energy from this reaction could be very different—e.g. moving charge could generate electricity directly. Moreover it is not essential for fusion to take place; the enhanced pressures and temperatures caused inside the collapsed bubble by the target shapes in accordance with the invention may be useful in other contexts to study other reactions under exotic conditions.

The invention is applicable in all such contexts as well as many others.

The invention claimed is:

1. A method of impacting liquid droplets onto a surface comprising providing a series of liquid droplets, directing said liquid droplets at a non-planar target surface to cause a shockwave in the droplets upon impact, the non-planar target surface having a predefined shape and size at the location of impact of the droplet to intensify the shockwave in the droplet, wherein the predefined shape and size of the target surface at the location of impact of the droplet is concave and corresponds to the shape and size of the droplet.

2. A method as claimed in claim 1, comprising producing a pressurised liquid jet stream comprising a liquid and a nano-particle material, causing the break-up of said jet stream to produce a plurality of droplets containing liquid and nano-particle material, and irradiating the droplets with energy to produce and expand cavities within the droplets.

3. A method as claimed in claim 1, comprising producing a pressurised liquid jet stream comprising a liquid and a volatile emulsion, and causing the break-up of said jet stream to produce a plurality of droplets containing both said liquid and said volatile emulsion.

4. A method as claimed in claim 1, wherein the surface is shaped such that when the droplet initially impacts the target, the boundary of the contact patch between the droplet and the surface travels at a supersonic speed for a time period significantly beyond the initial moment of collision.

5. A method as claimed in claim 1, wherein the target surface comprises a plurality of discrete portions.

6. A method as claimed in claim 1, wherein the target surface is shaped such that there are a plurality of discrete initial contact points between the droplet and surface.

7. A method as claimed in claim 6, wherein the target surface comprises a plurality of protrusions to act as the plurality of discrete initial contact points.

8. An apparatus for impacting liquid droplets onto a surface comprising an arrangement for producing a series of liquid droplets, an arrangement for directing said liquid droplets at a non-planar target surface to cause a shockwave in the droplets upon impact, wherein said non-planar target surface has a predefined shape and size at the location of impact of the droplet to intensify the shockwave in the droplet, wherein the predefined shape and size of the target surface at the location of impact of the droplet is concave and corresponds to the shape and size of the droplet.

9. An apparatus as claimed in claim 8, comprising an arrangement for producing a pressurised liquid jet stream comprising a liquid and a nano-particle material, an arrangement for causing the break-up of said jet stream to produce a plurality of droplets containing liquid and nano-particle material, and an arrangement for irradiating the droplets with energy to produce and expand cavities within the droplets.

10. An apparatus as claimed in claim 8, comprising an arrangement for producing a pressurised liquid jet stream comprising a liquid and a volatile emulsion, and an arrangement for causing the break-up of said jet stream to produce a plurality of droplets containing both said liquid and said volatile emulsion.

11. An apparatus as claimed in claim 8, wherein the surface is shaped such that when the droplet initially impacts the target, the boundary of the contact patch between the droplet and the surface travels at a supersonic speed for a time period significantly beyond the initial moment of collision.

12. An apparatus as claimed in claim 8, wherein the target surface comprises a plurality of discrete portions.

13. An apparatus as claimed in claim 8, wherein the target surface is shaped such that there are a plurality of discrete initial contact points between the droplet and surface.

14. An apparatus as claimed in claim 13, wherein the target surface comprises a plurality of protrusions to act as the plurality of discrete initial contact points.

* * * * *